July 25, 1950 — E. SOKOLIK — 2,516,430
TUG HOOK AND SPRING DEVICE
Filed July 30, 1945
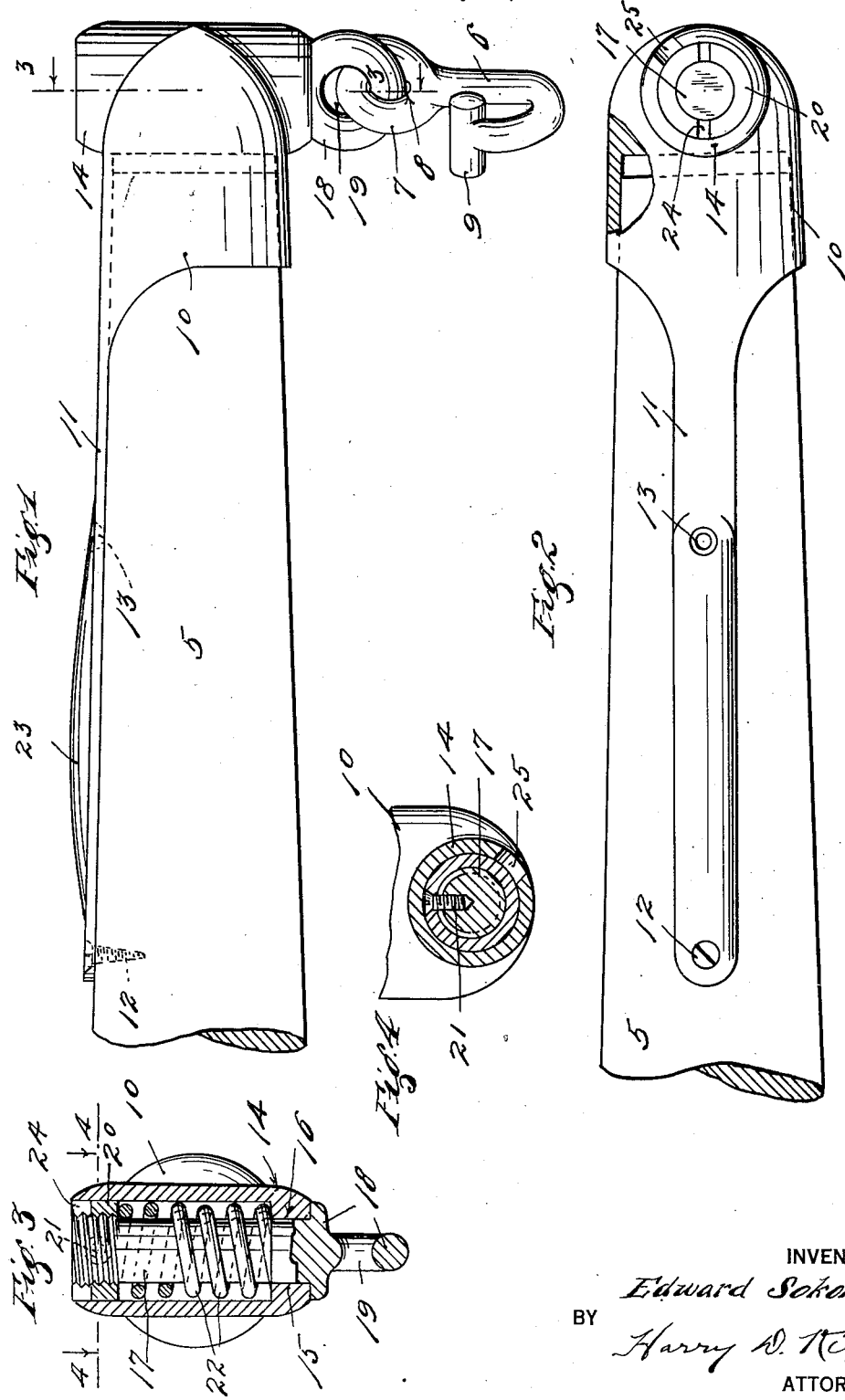
INVENTOR
Edward Sokolik
BY
Harry D. Kilgore
ATTORNEY Patented July 25, 1950

2,516,430

UNITED STATES PATENT OFFICE 2,516,430

TUG HOOK AND SPRING DEVICE

Edward Sokolik, New Brighton, Minn.

Application July 30, 1945, Serial No. 607,842

7 Claims. (Cl. 278—103)

My present invention relates to improvements in harness tug hooks and the method of attaching the same to a singletree and, more particularly, the invention relates to a novel hook and a spring device for attaching the same to a singletree.

It is now the general practice, in attaching a tug hook to a wood singletree, to flexibly connect the hook to a sleeve and secure said sleeve around one of the end portions of a singletree by driving one or more wedges into the respective end of the singletree to extend the same against said sleeve. This method of attaching a tug hook to a singletree is not good practice for the reason that the driving of the wedges mutilates the singletree and leaves the same exposed to the weather so that rain and dampness decay the wood. Furthermore, when the wood shrinks, the encircling sleeve becomes loose.

An object of this invention is to absorb vibrations and shocks produced by wagons, machinery, implements and plows drawn by draft animals over stony ground and prevent the same from being transmitted to the shoulders of the animals.

Another object of this invention is to prevent detachment of a tug from a tug hook and eliminate twists therein.

These and other objects of the invention will be apparent from the following description, reference being had to the drawing.

To the above end, generally stated, the invention consists of the novel devices and combination of devices hereinafter described and defined in the claims.

In the accompanying drawing, which illustrates the invention, like characters indicate like parts throughout the several views.

Referring to the drawing:

Fig. 1 is a plan view of one end portion of a singletree having the invention applied thereto;

Fig. 2 is a rear elevation of the parts shown, with a portion of the cap broken away and sectioned;

Fig. 3 is a view partly in elevation and partly in section taken on the line 3—3 of Fig. 1; and Fig. 4 is a fragmentary view principally in section taken on the line 4—4 of Fig. 3.

The numeral 5 indicates one of the end portions of a wood singletree. A novel harness (safety hitch) tug hook 6 is provided with a head 7 having therein an eye 8. The free end portion of the hook 6 is in the form of a T and the transverse member thereof is designated by the numeral 9. The length of the member 9 is such that it must be inserted endwise through the eye in the other outer end of a harness tug, not shown, and hence the tug cannot be accidentally detached therefrom when there is slack therein.

Fitted over one end portion of the singletree 5 is a metal cap 10 having an integral strap 11 that extends longitudinally along the back of said singletree and is secured thereto by a screw 12.

It will be noted that the cap 10 does not engage the end of the singletree so that in case said singletree shrinks, the screw 12 may be removed, the cap 10 driven onto said singletree and then said screw inserted through a second hole 13 in the strap 11 and is turned into the wood. The reason for this is that the new hole in the singletree 5 would be too close to the old one.

Formed with the cap 10 is a housing 14 that is horizontally disposed and extends transversely of the singletree 5. The longitudinal axes of the singletree 5, the cap 10 and the housing 14 are all substantially in the same plane and the projected axis of said singletree bisects the axis of said housing substantially at its longitudinal center. The interior of the housing 14 is cylindrical and the rear end is open and its front end is closed by a head 15 except for a hole 16 therein that is concentric with the cylindrical interior of said housing.

A round drawbar 17, provided with a head 18, having therein an eye 19, is inserted into the housing 14 through the hole 16. Obviously, the head 16 affords a bearing for the drawbar 17 in which bearing said drawbar is swivelled. The eye-equipped heads 7 and 18 are inter-connected and flexibly connect the hook 6 to the drawbar 17.

A nut or collar 20 on the rear end portion of the drawbar 17 has screw-threaded engagement therewith. This collar 20 has a round periphery that has a working fit with the cylindrical interior of the housing 14 and is free for swivel movement with said drawbar. In addition to the screw thread that connects the collar 20 to the drawbar 17, said collar is further connected to said drawbar by a screw 21 that prevents the collar 20 from turning relative to the drawbar 17, see Fig. 4.

A coiled spring 22, encircling the drawbar 17, is compressed between the housing head 15 and the collar 20 and normally yieldingly holds the drawbar 17 with its head 18 against said housing head.

When a load is being pulled, the spring 22 will be further compressed and the drawbar head 18 will be out of contact with the housing head 15 so that the drawbar 17 is free to reciprocate relative to the housing 14 and thereby absorb all vibrations and shocks and thus prevent the same from being transmitted to the shoulders of the animal or animals pulling the load.

At all times the drawbar 17 is free for swivel movement and thus eliminates twists in a harness tug attached to the hook 6. The strap 11, in addition to affording means for attaching the cap 10 to the singletree 5, reinforces said singletree and also affords a wheel rub iron where said strap is thickened, as indicated at 23. The drawbar 17 and the collar 20 completely close the rear end of the housing 14, thereby excluding dust and rain therefrom. In the outer face of the collar 20 is a pair of diametrically opposite nicks 24 for a wrench in turning said collar onto or off from the drawbar 17. A notch 25 in the rear end portion of the housing 14 permits a screw driver to be applied to the screw 21. It will be noted that the notch 25 is out of the normal position of the screw 21 so that said screw is held against outward movement by the housing 14.

From what has been said, it will be understood that the invention described is capable of modifications as to details of construction and arrangement within the scope of the invention disclosed and claimed.

What I claim is:

1. In combination with a wooden single-tree, a pair of shock absorbing swivel hitch irons, each comprising: a body portion including an integrally combined tubular end-cap and a tubular cylinder, said cap being tubular and annularly slightly tapered toward the cylinder, which is in right angular alignment therewith, and having a substantially equal depth and diameter and, at least two counter-sunk screw-holes; bevel-headed screws for the screw-holes; said cylinder slightly exceeding in length the diameter of the cap and having the axis thereof substantially equally bisected by the axis of the cap, a diameter equal, at least, to that of the cap, a bore axially formed therein, a small hole leading to the bore, said bore having an open rear end, a head having a seating face on the inner and outer side thereof and a long bore-bearing extending therethrough, in the front end; a cylindrical piston-rod projecting through the bore-bearing into the bore, said piston-rod having a screw-threaded inner end-portion and an eye-equipped head on the outer end-portion, said head having a subjacent seating face cooperating with the seating face of the cylinder head; a safety-hitch tug hook flexibly inter-connected to the eye-equipped head; a compression spring telescopically mounted upon the piston-rod and in the bore; a cylindrical piston telescopically mounted in the bore and having a screw-threaded bore extending axially therethrough, engaging the screw-threaded end-portion of the piston-rod and slightly compressing the spring, said piston being adapted to be screwed onto, and keyed to the piston-rod; means to key the piston to the piston-rod, said means being applied through said small hole; said combination of piston-rod, compression spring and piston having the combined function of swiveling, of yielding reciprocatory movement and of a unitary journal.

2. The structure defined in claim 1 in which the safety hitch tug hook is in the form of a J, of which the inter-connecting end is provided with an eye-equipped head and the curved or hitching end with a member transversely integral therewith in the form of a T terminal.

3. The structure defined in claim 1 in which the cap has a long narrow metal strap projecting therefrom along the back of the single-tree, said strap having spaced counter-sunk screw-holes therein, and affording means whereby to secure the hitch iron to the single-tree, for implement wheels to rub thereagainst and thus protect the wood of the single-tree and to re-enforce same.

4. The structure defined in claim 1 in which the cap has a long narrow metal strap projecting therefrom along the back of the single-tree, said strap having spaced counter-sunk screw-holes therein, and being re-enforced where implement wheels rub thereagainst, and affording means whereby to secure the hitch iron to the single-tree and re-enforce same.

5. In combination with a metal single-tree, a pair of shock absorbing swivel hitch irons, each comprising: a tubular cylinder in right angular alignment with the axis of the single-tree, said axis substantially equally bisecting the axis of the cylinder, said cylinder having a bore axially formed therein and a small hole leading to the bore, said bore having an open rear end, a head having a seating face on the inner and outer sides thereof and a long bore-bearing extending therethrough, in the front end; a cylindrical piston-rod projecting through the bore-bearing into the bore, said piston-rod having a screw-threaded inner end-portion and an eye-equipped head on the outer end-portion, said head having a subjacent seating face cooperating with the seating face of the cylinder head; a safety-hitch tug hook flexibly inter-connected to the eye-equipped head; a compression spring telescopically mounted upon the piston-rod and in the bore; a cylindrical piston telescopically mounted in the bore and having a screw-threaded bore extending axially therethrough, engaging the screw-threaded end-portion of the piston-rod and slightly compressing the spring, said piston being adapted to be screwed onto, and keyed to the piston-rod; means to key the piston to the piston-rod, said means being applied through the said small hole, said combination of piston-rod, compression spring and piston having the combined function of swiveling, of yielding reciprocatory movement and of a unitary journal.

6. In each of a pair of shock absorbing swivel hitch irons, a body including an integrally combined end-cap and a tubular cylinder, said cap being tubular and annularly slightly tapered toward the cylinder with which it is aligned at right angle, and having a substantially equal depth and diameter, and at least two counter-sunk screw-holes; bevel headed screws for said screw-holes; said cylinder slightly exceeding in length the diameter of the cap and having the axis thereof substantially equally bisected by the axis of the cap, a diameter equal, at least to that of the cap, a bore axially formed therein, a screw hole leading to the bore, said bore having an open near end; a head forming the front end and having a seating face on the inner and outer side thereof and a substantially long bore-bearing extending therethrough; a piston-rod having a rear end-portion and projecting through the bore-bearing into the bore of the cylinder and provided with a flexible safety hitching hook; a coil spring encircling the piston-rod in the core of the cylinder and piston means cooperating with the rear end-portion of the piston-rod, said means and said piston rod with its encircling coil spring conjointly affording a compressible reciprocating swiveling journal bearing.

7. In each of a pair of shock absorbing swivel hitch irons, a body including an integrally combined end-cap and a tubular cylinder having a bore formed therein, said bore having an open rear end and a head having a bore bearing in the front end thereof; a cylindrical piston-rod of constant diameter and having a screw-threaded rear end-portion and a front end-portion consisting of a head having a connecting eye and a base adapted to seat against the bore bearing; a flexible safety hitching hook interconnected to said connecting eye; a compression spring encircling the piston-rod in the bore of the cylinder; a piston nut lockably engaging the screw-threaded end-portion of the piston-rod and slightly compressing the spring against the cylinder head, said piston nut and said piston-rod with its encircling coil spring conjointly affording a compressible reciprocating swiveling journal bearing.

EDWARD SOKOLIK.

REFERENCES CITED

The following references are of record in the file of this patent:

UNITED STATES PATENTS

| Number | Name | Date |
|---|---|---|
| 218,305 | McClure | Aug. 5, 1879 |
| 219,919 | Cullers | Sept. 23, 1879 |
| 390,738 | Wilson | Oct. 9, 1888 |
| 932,932 | Willson | Aug. 31, 1909 |